(12) United States Patent
Nishi et al.

(10) Patent No.: US 6,699,428 B2
(45) Date of Patent: Mar. 2, 2004

(54) CERAMIC BODY PRODUCING METHOD

(75) Inventors: Hideaki Nishi, Nagoya (JP); Eiji Ito, Nagoya (JP); Yoshimasa Kondo, Nagoya (JP)

(73) Assignee: NGK Insulators, Ltd. (JP)

( * ) Notice: Subject to any disclaimer, the term of this patent is extended or adjusted under 35 U.S.C. 154(b) by 84 days.

(21) Appl. No.: 10/030,434

(22) PCT Filed: Apr. 12, 2001

(86) PCT No.: PCT/JP01/03171

§ 371 (c)(1),
(2), (4) Date: Apr. 23, 2002

(87) PCT Pub. No.: WO01/85413

PCT Pub. Date: Nov. 15, 2001

(65) Prior Publication Data

US 2002/0135107 A1 Sep. 26, 2002

(30) Foreign Application Priority Data

May 10, 2000 (JP) ........................... 2000-137340

(51) Int. Cl.[7] .................................. B28B 1/00
(52) U.S. Cl. .......................... 264/630; 264/610
(58) Field of Search ................. 264/630, 631, 264/610

(56) References Cited

U.S. PATENT DOCUMENTS 4,519,820 A * 5/1985 Oyobe et al. .............. 55/284
4,559,193 A * 12/1985 Ogawa et al. .............. 55/523
5,021,204 A * 6/1991 Frost et al.
5,284,638 A * 2/1994 Hertl et al.

FOREIGN PATENT DOCUMENTS

JP 10-99626 4/1998
JP 2000-190312 7/2000

OTHER PUBLICATIONS

Derwent Acc–No. 1984–310511, Method of Making Porous Plugged, Monolith Particulate Trap, 1999.*

* cited by examiner

Primary Examiner—Christopher A. Fiorilla
(74) Attorney, Agent, or Firm—Parkhurst & Wendel, L.L.P.

(57) ABSTRACT

A method of producing a ceramic body having a construction such that cells are plugged alternately at both end faces of a ceramic honeycomb structural body by filling a plugging slurry into predetermined cells at both end faces of a ceramic honeycomb formed body, having the steps of: filling a plugging material for mask into the cells to be opened at one end face of the ceramic honeycomb formed body; immersing the end face, to which the plugging material for mask is filled, into a plugging slurry; and drying and sintering the ceramic honeycomb formed body while the plugging material for mask is removed during a drying step or a sintering step.

3 Claims, 14 Drawing Sheets

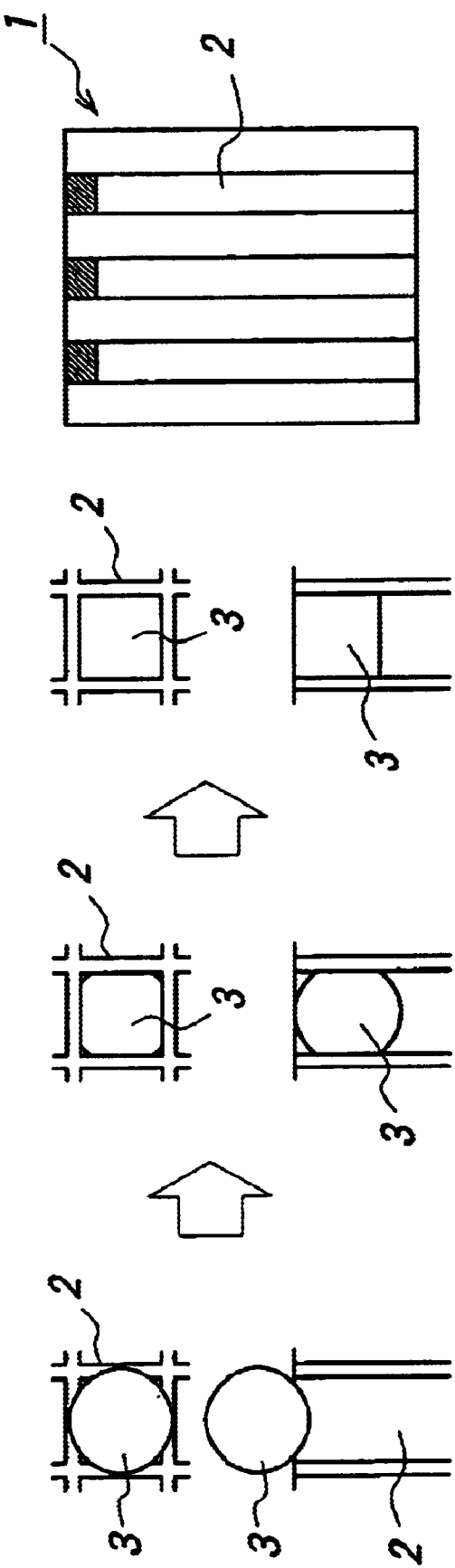

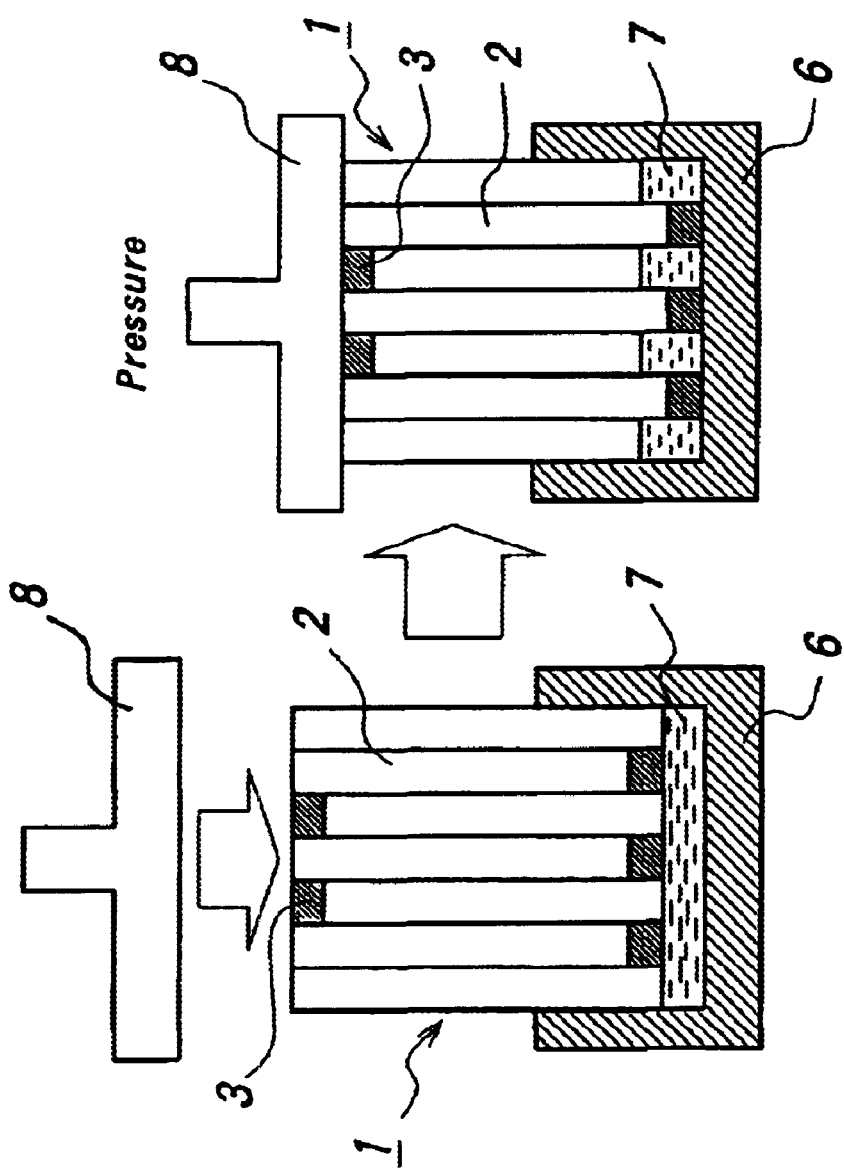

A-A cross section

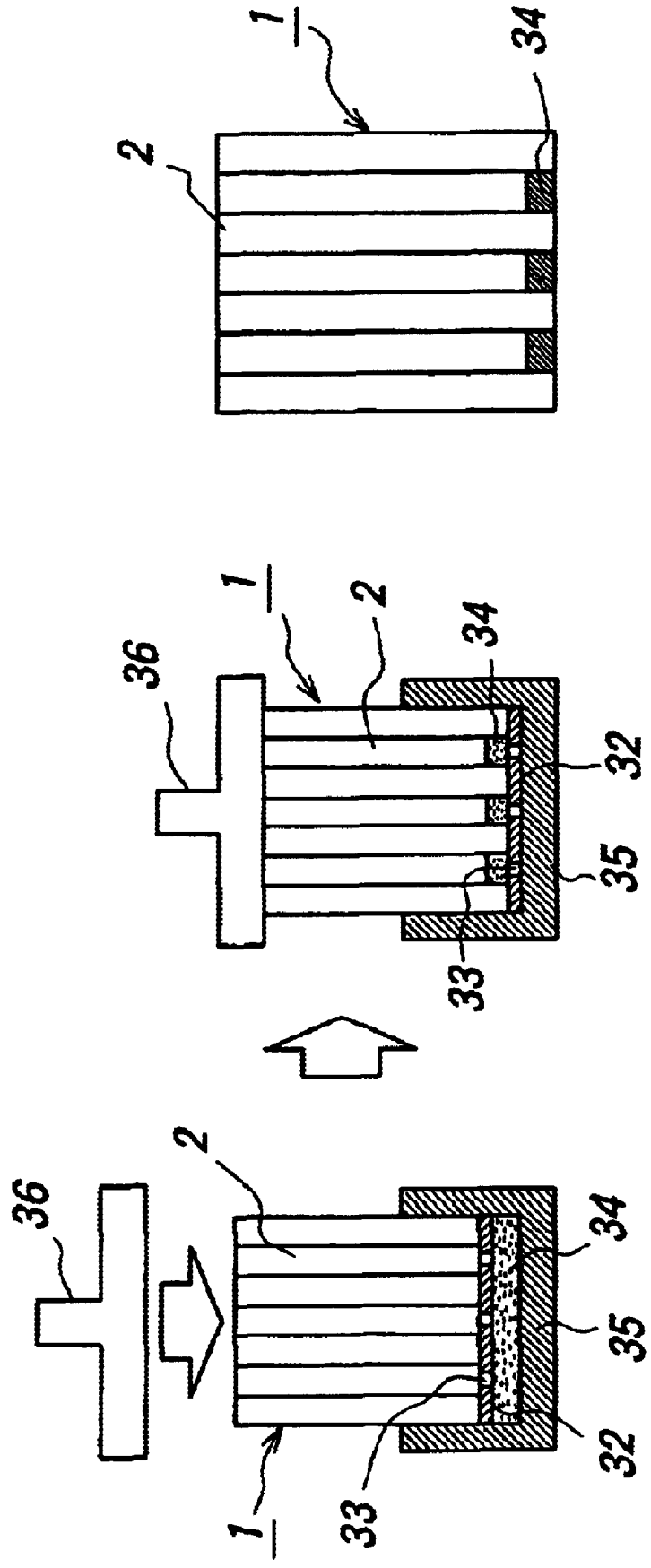

CERAMIC BODY PRODUCING METHOD

TECHNICAL FIELD

The present invention relates to a method of producing a ceramic body having a construction such that cells are plugged alternately at both end faces of a ceramic honeycomb structural body.

BACKGROUND ART

Up to now, in order to produce a ceramic body in which cells are plugged alternately at both end faces of a ceramic honeycomb structural body, various producing methods have been known. FIGS. 15a–15c are schematic views respectively explaining one embodiment of a method of producing such a known ceramic body. According to FIGS. 15a–15c, one embodiment of the known method of producing the ceramic body will be explained. At first, as shown in FIG. 15a, a mask 54 made of rubber having holes 53 corresponding to cells 52 to be plugged at an end face of a ceramic honeycomb formed body 51 (ceramic honeycomb structural body before sintering) is prepared, and the thus prepared mask 54 is set at a predetermined position on the end face of the ceramic honeycomb formed body 51 by hand.

Then, as shown in FIG. 15b, the end face of the ceramic honeycomb formed body 51, to which thee mask 54 is set, is immersed in a plugging slurry 55, and, a pressure is applied to the ceramic honeycomb formed body 51 from above, so that the cells 52 are filled with the slurry 55 through the holes 53 of the mask 54. At the other end face of the ceramic honeycomb formed body 51, predetermined cells 52 are filled with the slurry 55 in the same manner. In this case, a mask having a reverse hole pattern such that holes are arranged at portions where no holes 53 of the mask 54 are arranged is used so as to obtain a construction such that the cells 52 are plugged alternately at both end faces of the ceramic honeycomb structural body. According to the processes mentioned above, as shown in FIG. 15c by cross section, it is possible to obtain the ceramic honeycomb formed body 51 having a construction such that the cells 2 are plugged alternately at its both end faces.

However, in the method of producing the known ceramic body mentioned above, it is difficult to make the mask 54 having the predetermined holes 53 and to set the mask 54 accurately on the end face of the ceramic honeycomb formed body 51. Particularly, in a large size ceramic body having a diameter of about 300 mm which is recently required, the number of cells 52 at the end face reaches to few ten-thousands, and thus the difficulties mentioned above become worse. Moreover, since the mask 54 is set on the end face of the ceramic honeycomb formed body 51 by hand, it is necessary for a worker to get skillful and this setting operation requires much time. In addition, there is a problem such that this setting operation is not automated. Further, after the plugging operation, it is necessary to perform a cleaning operation of the mask 54 for recycling. However, since the mask 54 has a large number of cells as mentioned above, there is a problem such that it is very difficult to clean up the mask 54.

DISCLOSURE OF INVENTION

An object of the invention is to eliminate the drawbacks mentioned above and to provide a method of producing a ceramic body which can easily plug cells at an end face and which can be easily automated.

According to a method of producing a ceramic body according to the invention, a method of producing a ceramic body having a construction such that cells are plugged alternately at both end faces of a ceramic honeycomb structural body by filling a plugging slurry into predetermined cells at both end faces of a ceramic honeycomb formed body, comprises the steps of: filling a plugging material for mask into the cells to be opened at one end face of the ceramic honeycomb formed body; immersing the end face, to which the plugging material for mask is filled, into a plugging slurry; and drying and sintering the ceramic honeycomb formed body while the plugging material for mask is removed during a drying step or a sintering step.

In the present invention, since a plugging operation of the end face of the ceramic honeycomb structural body is performed by using a plugging material for mask which can be removed at the sintering without using a mask, it is possible to eliminate a production of the mask and a setting operation of the mask with respect to the end face of the ceramic honeycomb structural body. Moreover, since a filling operation of various plugging materials for mask mentioned below can be easily automated, the plugging operation of the ceramic body according to the invention can be also automated.

As a preferred embodiment of the invention, the plugging material for mask filling step further comprises the steps of: preparing a suction jig having a same honeycomb construction as that of the ceramic honeycomb formed body; adhering a mask, in which holes are arranged corresponding to the cells to be plugged, to one end face of the suction jig; sucking paraffin balls, a diameter of which is larger than a length of one side of the cell, to the predetermined cells at the other end face by sucking from the end face to which the mask is adhered; setting the suction jig, to which paraffin balls are sucked, to the end face of the ceramic honeycomb formed body to which the plugging material is to be filled; aligning the paraffin balls to the cells to be opened by stopping the sucking operation; inserting the thus aligned paraffin balls into the cells by applying pressure; and filling the paraffin balls into the cells to be opened as the plugging material for mask. Moreover, the plugging material for mask filling step further comprises the steps of: making a mask for respective ceramic honeycomb formed bodies by piercing a sheet adhered to one end face of the ceramic honeycomb formed body at positions corresponding to the cells to be plugged; immersing the one end face to which the mask is adhered into a liquid paraffin; inserting the liquid paraffin into the cells through the holes of the mask by applying a pressure; and filling the liquid paraffin into the cells to be opened as the plugging material for mask. Further, the plugging material for mask filling step further comprises the steps of: immersing one end face of the ceramic honeycomb formed body into a photo-curing resin before hardening; emanating a light to the photo-curing resin from the other end face through a mask, in which a light is transmitted only to the cells to be opened, so as to harden the photo-curing resin; and filling the photo-curing resin into the cells to be opened as the plugging material for mask. In all the preferred embodiments mentioned above, it is possible to perform a filling operation of the plugging material for mask with respect to the ceramic honeycomb structural body effectively, and thus it is preferred.

BRIEF DESCRIPTION OF THE INVENTION

FIGS. 2a–2d are schematic views respectively explaining another step in the method shown in FIG. 1.

FIGS. 4a–4c are schematic views respectively explaining still another step in the method shown in FIG. 1.

FIGS. 11a–11c are schematic views respectively explaining still another step in the embodiment shown in FIG. 8.

BEST MODE FOR CARRYING OUT THE INVENTION

The most important features of the invention is to perform the steps of: filling a plugging material for mask such as paraffin and photo-curing resin into cells to be opened of a ceramic honeycomb formed body; filling a plugging slurry into the cells to which the plugging material for mask is not filled; sintering the ceramic honeycomb formed body; and removing the plugging material for mask at the sintering step. As the ceramic honeycomb formed body, use is made of the known ceramic honeycomb formed body made of cordierite and so on. The ceramic honeycomb formed body can be produced according to the known manner by extruding raw material mixture from a die. Hereinafter, according to a difference of filling methods of the plugging material for mask, the embodiments (1) method of filling paraffin balls, (2) method of filling liquid paraffin through holes arranged to a sheet, and (3) method of filling photo-curing resin will be explained.

Figure 1A:
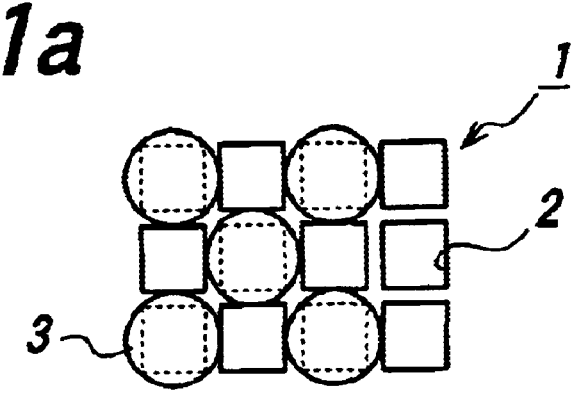
FIGS. 1a–1c are schematic view respectively explaining one step of a paraffin ball filling method as one example of a method of producing a ceramic body according to the invention.
Figure 1B:
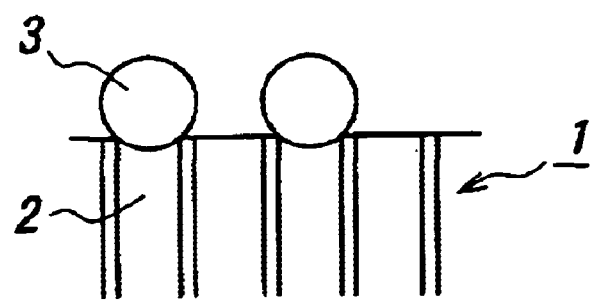
Figure 1C:
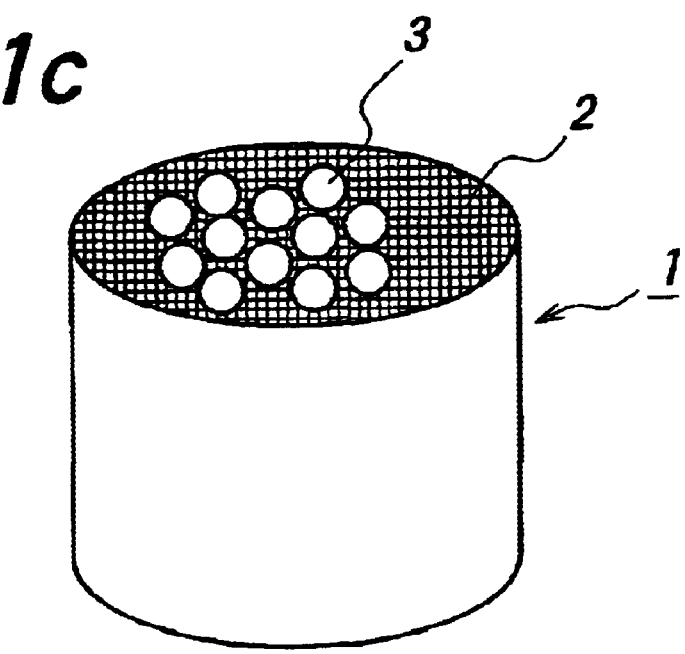

(1) As to a method of filling paraffin balls:

① Firstly, as shown in FIGS. 1a–1c, paraffin balls 3 having a diameter larger than a length of one side of cell 2 constituting a ceramic honeycomb formed body 1 are prepared, and the thus prepared paraffin balls 3 are aligned in a checkered pattern on the cells 2 to be opened at an end face of the ceramic honeycomb formed body 1. A method of aligning the paraffin balls 3 will be explained hereinafter in detail. In FIG. 1c, the paraffin balls 3 are shown larger as compared with their actual size so as to see them.

After aligning the paraffin balls 3 on the end face, as shown in FIGS. 2a and 2b, the paraffin balls 3 are inserted into the cells by applying a pressure thereto. In this case, the paraffin ball 3 is ground or deformed by a wall of the cell 2, and a space occurs between the paraffin ball 3 and an inner wall of the cell 2. Therefore, as shown in FIGS. 2c and 2d, the paraffin ball 3 is softened by heat and adapted to the inner wall of the cell 2 without spaces.

Figure 3A:
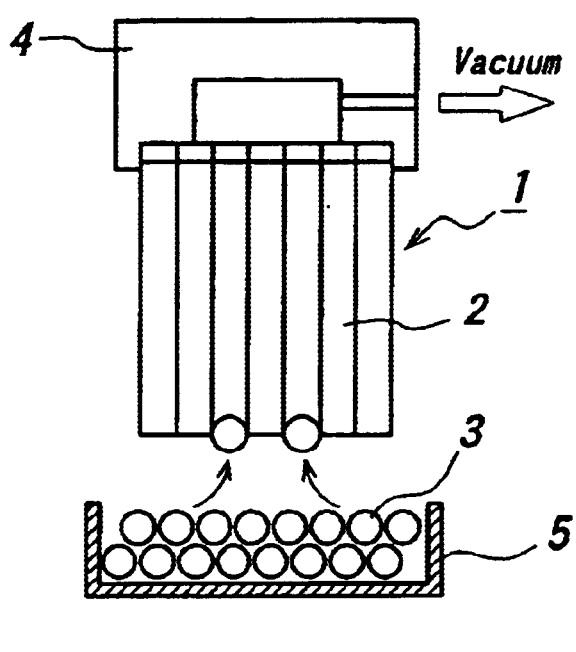
FIGS. 3a and 3b are schematic views respectively explaining still another step in the method shown in FIG. 1.
Figure 3B:
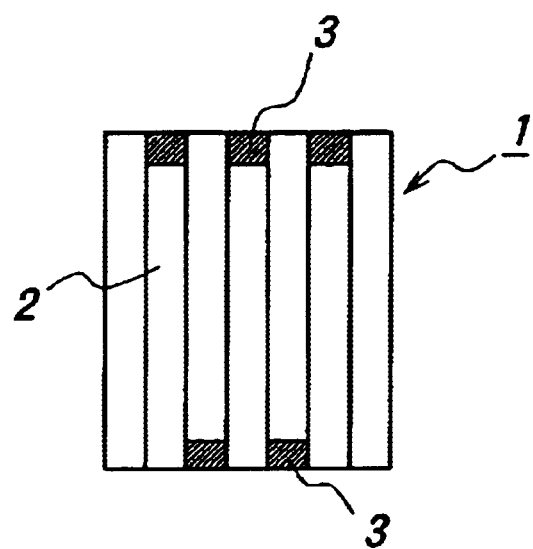

② Then, as shown in FIG. 3a, the ceramic honeycomb formed body 1 is set to a vacuum apparatus 4 which can function to vacuum only a center portion other than an outer peripheral portion of the ceramic honeycomb formed body 1 under a condition such that the end face of the ceramic honeycomb formed body 1 after the paraffin balls 3 are inserted into the predetermined cells 2 is positioned upward. Under such a condition, the ceramic honeycomb formed body 1 approaches to a tray 5 in which the paraffin balls 3 are filled, and the vacuum apparatus 4 starts to work. In this case, a vacuum state occurs only at the cells 2 to which the paraffin balls 3 are not filled at an upper end face of the ceramic honeycomb formed body 1, and thus the paraffin balls 3 are sucked to the predetermined cells 2 at an under end face. After that, as mentioned above, the paraffin balls 3 are inserted into the cells 2. In this manner, as shown in FIG. 3b, the paraffin balls 3 are filled into the cells 2 to be opened at the both end faces of the ceramic honeycomb formed body 1 as a plugging material for mask.

③ Then, as shown in FIG. 4a, the end face of the thus obtained ceramic honeycomb formed body 1 is immersed into a plugging slurry 7 stored in a vessel 6. Then, as shown in FIG. 4b, the plugging slurry 7 is filled into the predetermined cells 2, to which the paraffin balls 3 are not filled, by applying a pressure to the ceramic honeycomb formed body 1 from upward by means of a pressurized means 8. The same operations are performed repeatedly with respect to the other end face. As a result, as shown in FIG. 4c, it is possible to obtain the ceramic honeycomb formed body 1 in which the plugging slurry 7 is filled into the cells 2 at the both end faces to which the paraffin balls 2 are not filled.

Figure 5:
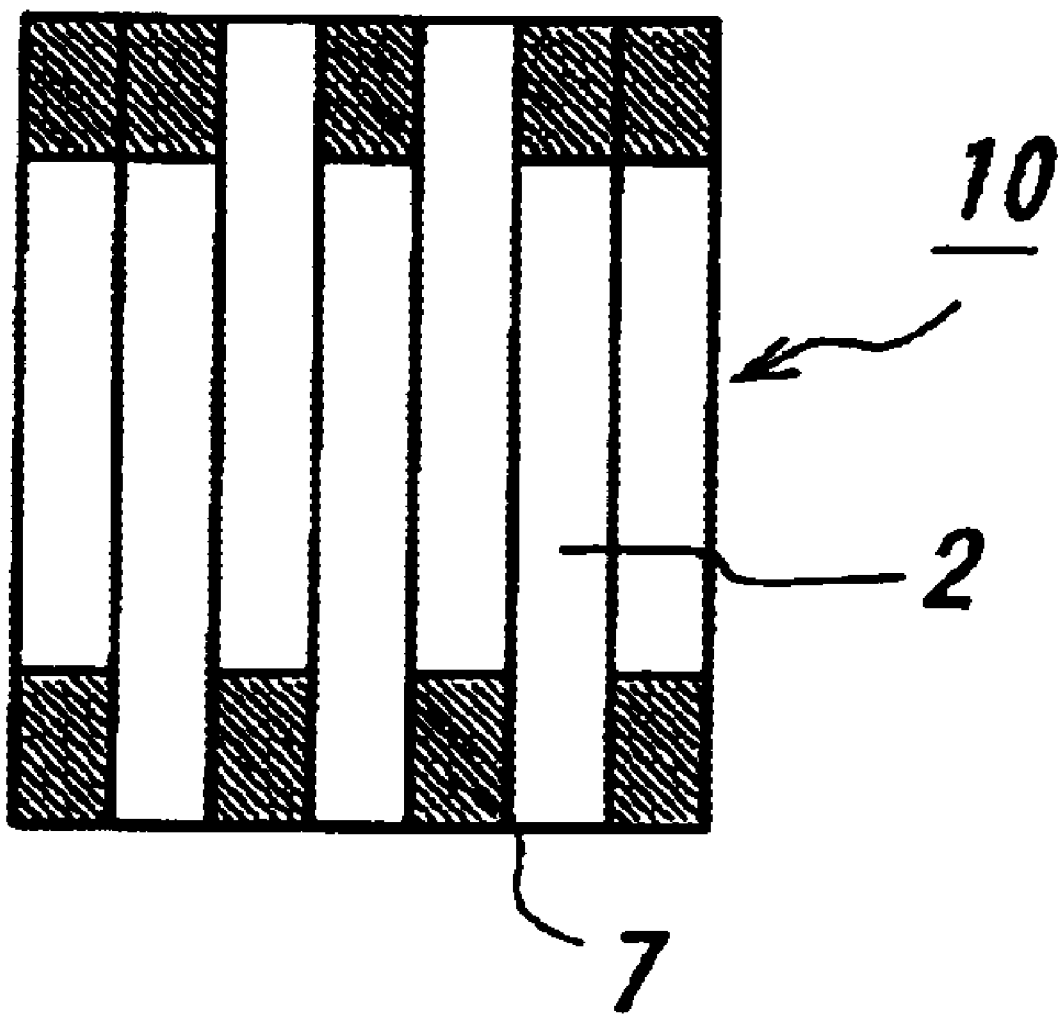
FIG. 5 is a schematic view showing one embodiment of a ceramic body according to the invention.

④ Then, the thus obtained ceramic honeycomb formed body 1 is sintered as is the same manner as that of the known manner after drying. At the drying step or the sintering step, the plugging slurry 7 is dried and sintered so as to integrate with a cell wall 9. At the same time, the paraffin balls 3 are melted and removed. As a result, as shown in FIG. 5, it is possible to obtain a ceramic body 10 having a construction such that the cells 2 are plugged alternately at the both end faces of the ceramic honeycomb structural body.

⑤ As mentioned above, the method of filling the paraffin balls are finished. Hereinafter, as a preferable method of aligning the paraffin balls 3 to the predetermined cells 2, (a) method of utilizing a setter (formed body having the same honeycomb structure as that of the ceramic honeycomb formed body) as a paraffin ball suction jig, and (b) method of utilizing the ceramic honeycomb formed body itself as the paraffin ball suction jig will be explained.

Figure 6:
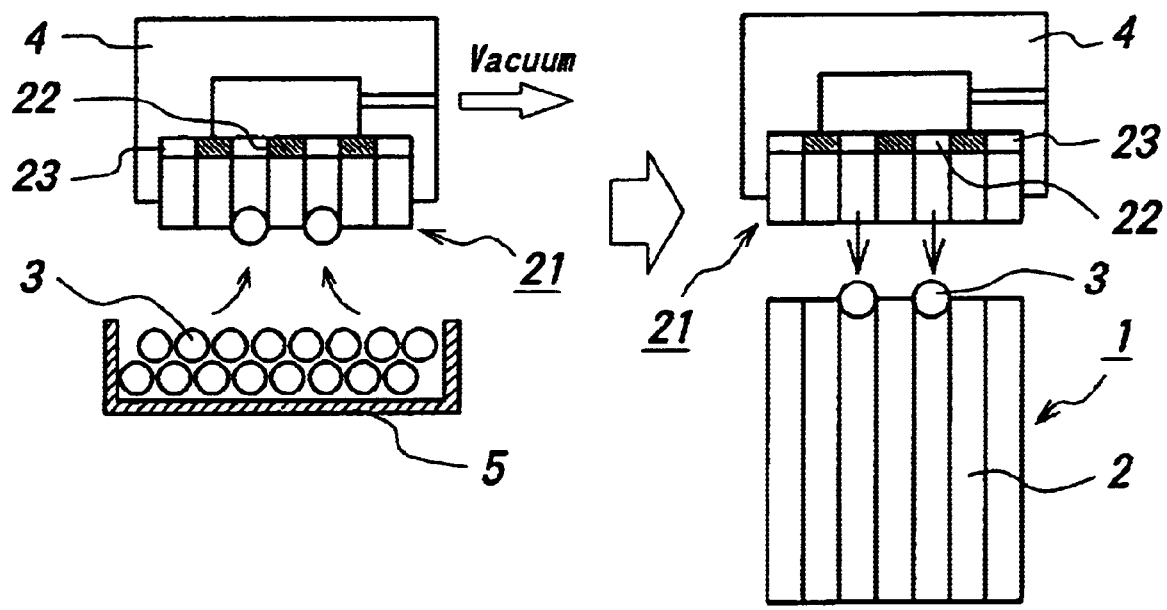
FIGS. 6a and 6b are schematic views respectively showing one embodiment of a paraffin ball aligning method in the embodiment shown in FIG. 1.

(a) As to a method of utilizing the setter as the paraffin ball suction jig (FIGS. 6a and 6b):

In this method, a setter 21 is formed simultaneously when the ceramic honeycomb formed body 1 is formed and is utilized as the suction jig. A mask 23 having a construction such that holes 22 are arranged in a checkered pattern at positions corresponding to the cells to be plugged is adhered to an upper face of the setter 21. The mask 23 may be formed by rubber, resin, paper and so on. The setter 21 is set to the vacuum apparatus 4 in such a manner that the surface, to which the mask 23 is adhered, is positioned upward. Then, the setter 21 approaches to the tray 5 in which the paraffin balls 3 are stored, and the suction apparatus 4 starts to work. As a result, the paraffin balls 3 are sucked in a checkered pattern on an under face of the setter 21. Then, the setter 21 is set on the end face of the ceramic honeycomb formed body 1 positioned by for example an image processing apparatus, and the vacuum apparatus 4 is stopped. In this manner, the paraffin balls 3 are aligned to the end face of the ceramic honeycomb formed body 1. Then, the same aligning operations are performed for the other end face by utilizing the setter 21, to which another mask 23 is adhered, so that thee paraffin balls 3 can be aligned at the both end faces.

Figure 7:
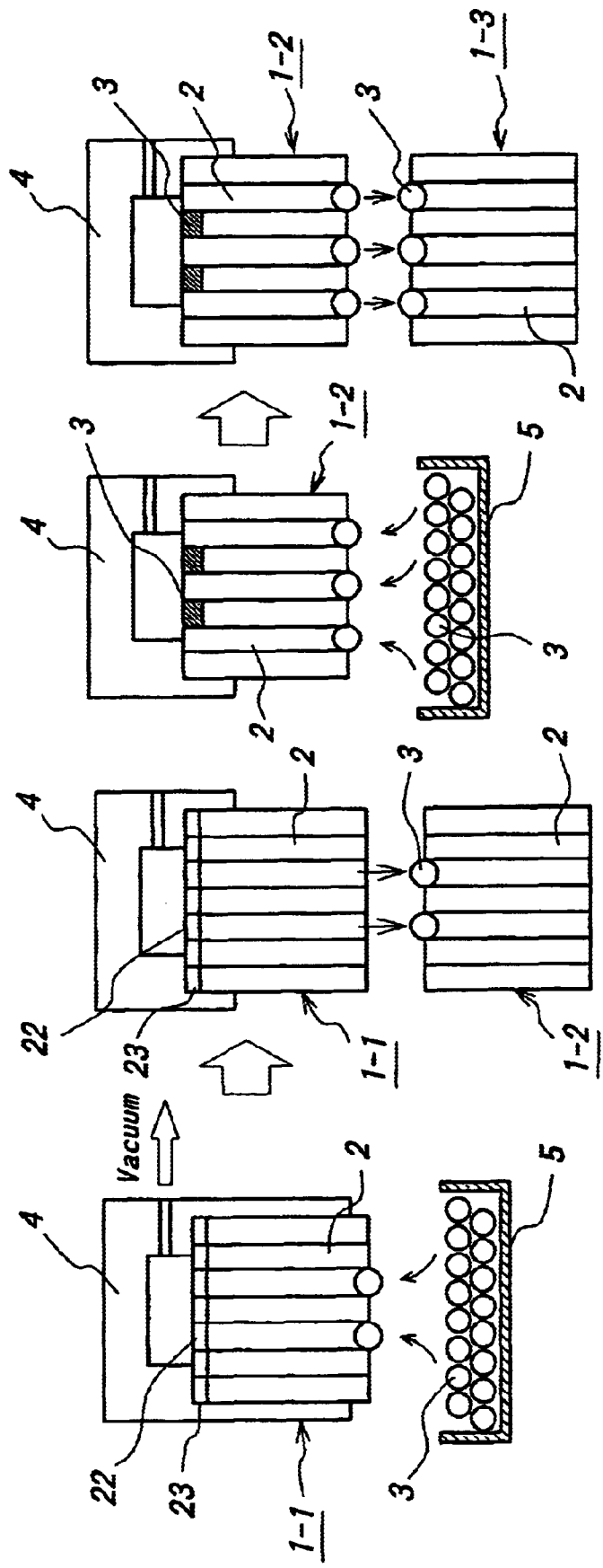
FIGS. 7a–7d are schematic views respectively showing another example of a paraffin ball aligning method in the embodiment method in the embodiment shown in FIG. 1.

In this method, the ceramic honeycomb formed body 1, in which the paraffin balls 3 are filled to the cells 2 at one end face, is utilized as the suction jig for filling the paraffin balls 3 to a next ceramic honeycomb formed body 1. At first, as shown in FIG. 7a, a ceramic honeycomb formed body 1—1, to which the mask 23 is adhered, is utilized for the first ceramic honeycomb formed body 1. Then, the paraffin balls 3 are aligned to the predetermined cells 2 at the end face of a next ceramic honeycomb formed body 1–2 in the same manner as that of the embodiment mentioned above except that the ceramic honeycomb formed body 1—1 is utilized as the setter 21 (FIG. 7b). After that, the paraffin balls 3 are aligned to the predetermined cells 2 at the end face of a further next ceramic honeycomb formed body 1–3 (FIG. 7d) in the same manner as that of the embodiment mentioned above except that the ceramic honeycomb formed body 1–2, in which the paraffin balls 3 are aligned at one end face, is utilized as the setter 21 (FIG. 7c). The above operations are repeated, so that the paraffin balls 3 are aligned at the both end faces.

Figure 8:
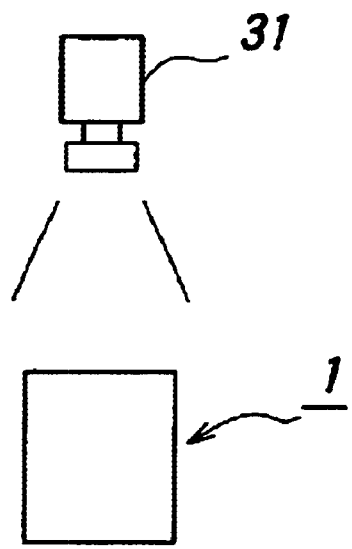
FIG. 8 is a schematic view explaining one step of a liquid paraffin filling method as another example of a method of producing a ceramic body according to the invention.

(2) As to a method of filling liquid paraffin through holes arranged to a sheet:

① Firstly, as shown in FIG. 8, an image of the end face of the ceramic honeycomb formed body 1 is picked-up by a camera 31, and the thus picked-up image is subjected to an image processing. In this manner, positions of all the cells 2 at the end face are recognized.

Figure 9A:
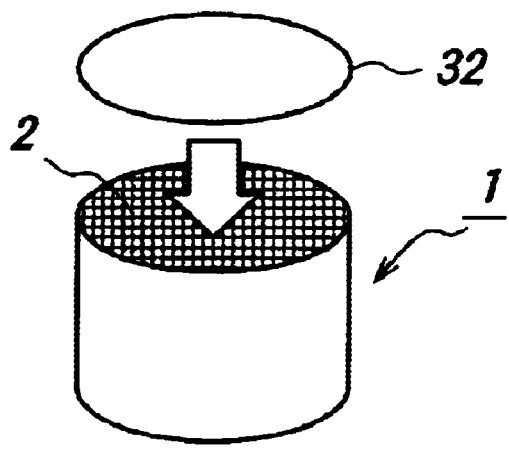
FIGS. 9a and 9b are schematic views respectively explaining another step in the embodiment shown in FIG. 8.
Figure 9B:
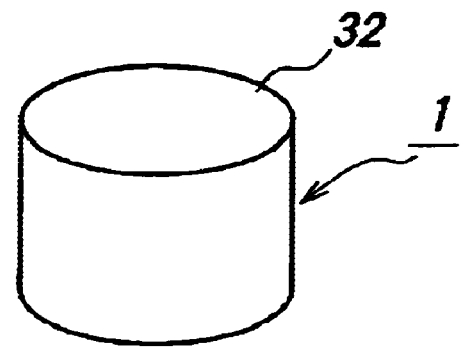

② Then, as shown in FIG. 9a, a sheet 32 having a dimension substantially equal to the end face of the ceramic honeycomb formed body 1 is prepared. Then, as shown in FIG. 9b, the thus prepared sheet 32 is adhered to the overall end face, the cell positions of which are recognized. As the sheet 32, a commercially available adhesive sheet can be used.

Figure 10A:
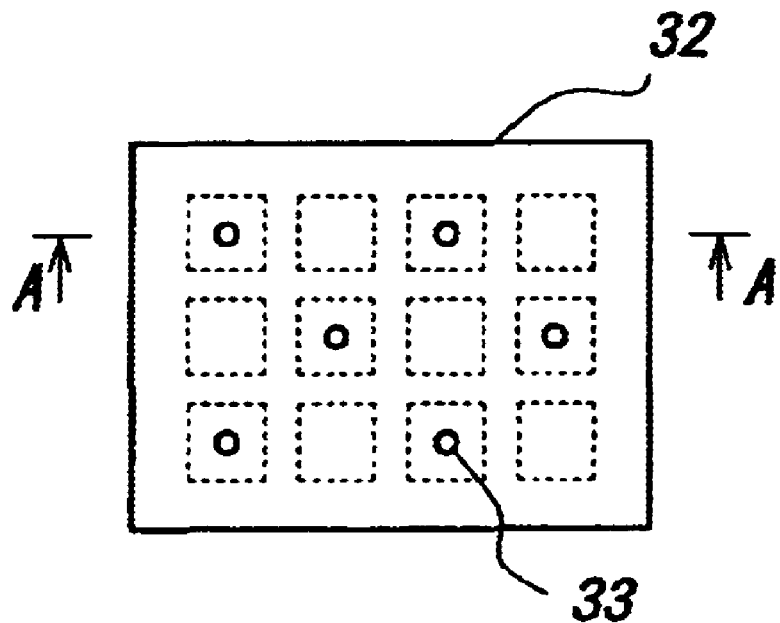
FIGS. 10a and 10b are schematic views respectively explaining still another step in the embodiment shown in FIG. 8.
Figure 10B:
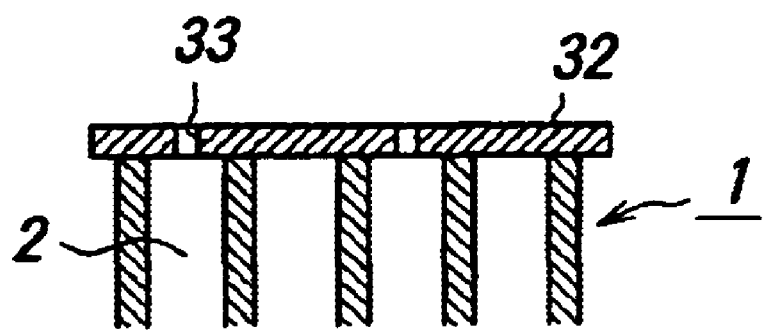

③ Then, as shown in FIGS. 10a and 10b, reference positions of small blocks defined according to a specification of the ceramic honeycomb formed body 1 such as outer diameter and cell pitch are calculated on the basis of the cell positions which are recognized by an image processing, and holes 33 are opened at the cell positions to be opened of the sheet 32 by means of a laser machining and so on, while the ceramic honeycomb formed body 1 is positioned by means of an XYZθ stage. The sheet 32 having the holes 33 functions as the mask. The hole 33 has a circular shape, and it is not necessary to open to an extent such that the hole 33 has the same (quadrangle) shape as that of the cell 2. Therefore, even in the case that a slight cell pitch variation occurs at the end face, there is no risk for piercing a cell wall and further a next cell, since a diameter of the hole 33 is smaller than the cell 2. In this case, it is preferred to set a diameter of the hole 33 corresponding to a viscosity of a melted liquid-like paraffin in such a manner that it is smaller when the viscosity is low and it is larger then the viscosity is high. Moreover, it is preferred to perform the above hole machining with respect to the sheet 32 for respective small blocks that are formed by dividing the cells 2 at the end face, but it is possible to perform the hole machining with respect to the overall end face. When the hole machining is performed for respective small blocks one by one, it is possible to perform the hole machining correctly, since variations of cell shape and cell pitch are small in such a small block region.

④ Then, as shown in FIGS. 11a–11c, a melted liquid paraffin 34 is filled into the cells 2 through the holes 33 of the sheet 32. That is to say, as shown in FIG. 11a, the end face to which the sheet 32 having the holes 33 is adhered is immersed into the liquid paraffin 34 in a vessel 35. Then, as shown in FIG. 11b, the ceramic honeycomb formed body 1 is pressed by utilizing a pressurized means 36, so that the liquid paraffin 34 is inserted by pressure into the cells 2 through the holes 33 of the sheet 32. Then, as shown in FIG. 11c, the sheet 32 is removed from the end face, and a paraffin filling operation for one end face is finished. After that, the same paraffin filling operation as mentioned above is performed for the other end face, and it is possible to obtain the ceramic honeycomb formed body 1 in which the predetermined cells 2 are filled with the liquid paraffin 34 at the both end faces.

⑤ Then, as explained by the previous embodiment shown in FIGS. 4a–4c, the plugging slurry 7 is filled into the cells 2 that are not plugged by the liquid paraffin 34 (corresponding to the paraffin 3 in FIG. 4) according to the known method. After that, the thus obtained ceramic honeycomb formed body 1 is dried and sintered, so that the paraffin 34 is removed and the plugging slurry 7 is integrated with the cell wall. Accordingly, it is possible to obtain the ceramic body 10 as shown in FIG. 5.

Figure 12:
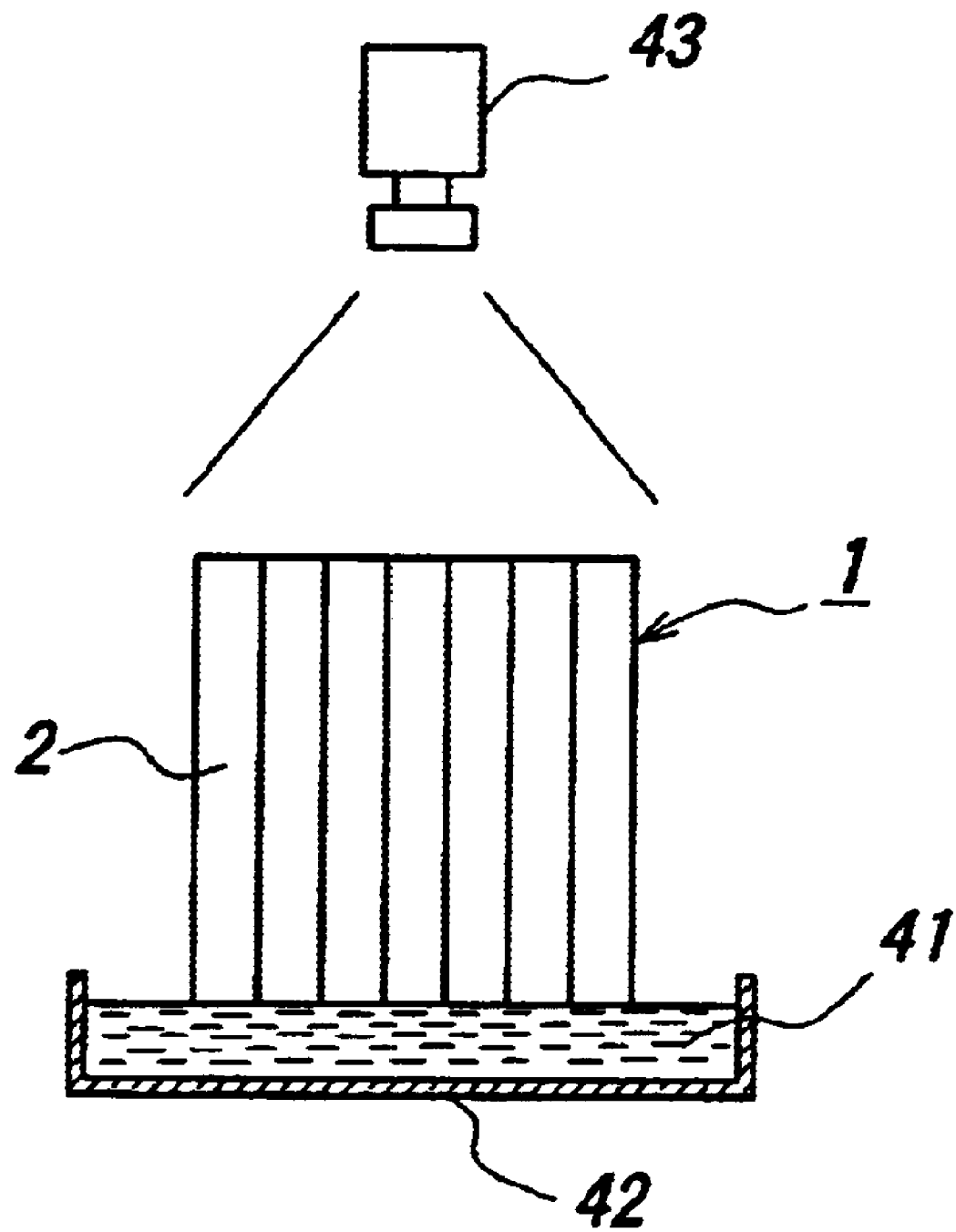
FIG. 12 is a schematic view explaining one step of a photo-curing resin filling method as still another example of a method of producing a ceramic body according to the invention.

(3) As to a method of filling a photo-curing resin:

① Firstly, as shown in FIG. 12, one end face of the ceramic honeycomb formed body 1 is immersed into a liquid photo-curing resin 41 before hardening stored in a tray 42. Then, an image of the other face of the ceramic honeycomb formed body 1 is picked-up by a camera 43, and the picked-up image is subjected to an image processing so as to recognize positions of all the cells 2 at the end face. In this case, it is possible to use the known photo-curing resin as the photo-curing resin 41.

Figure 13C:
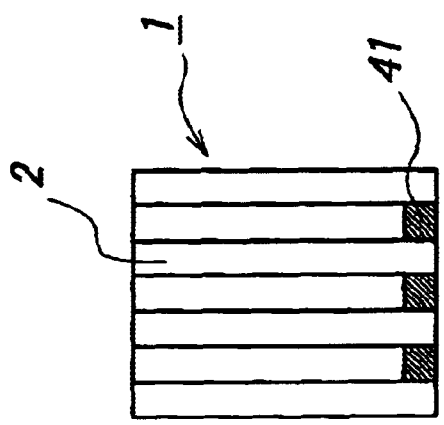
FIGS. 13a–13c are schematic views respectively explaining another step in the embodiment shown in FIG. 12.
Figure 13B:
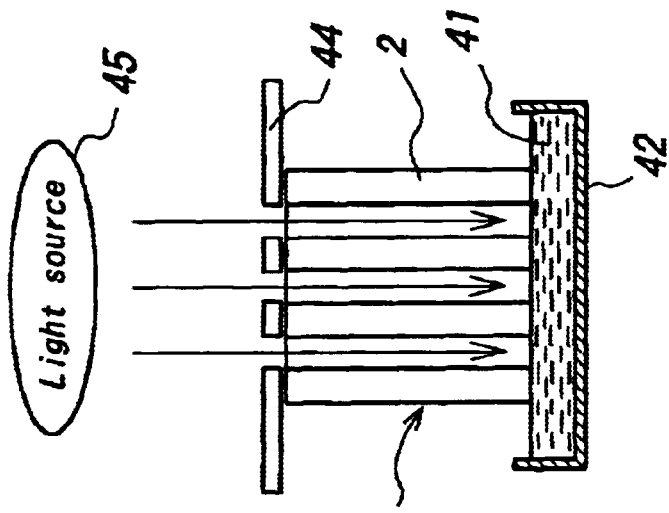
Figure 13A:
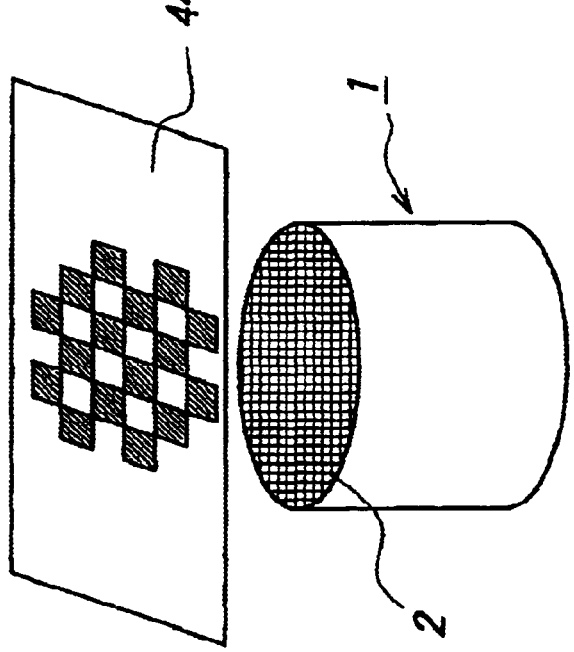

② Then, as shown in FIG. 13a, a mask 44 utilizing a liquid crystal is set to the end face of the ceramic honeycomb formed body 1 to which the cell positions are recognized, and the mask 44 is varied in a checkered pattern in such a manner that a light is introduced only to the cells to be opened on the basis of the position data of all the cells 2 obtained by an image processing. Then, as shown in FIG. 13b, a light emanating from a light source 45 is introduced to the end face of the ceramic honeycomb formed body 1 through the mask 44. By introducing a light through the cells 2, the photo-curing resin existing at the cells 2, through which a light is transmitted, is hardened. Moreover, as shown in FIG. 13c, the end face of the ceramic honeycomb formed body 1 is plugged by the hardened resin.

Figures 14A, 14B:
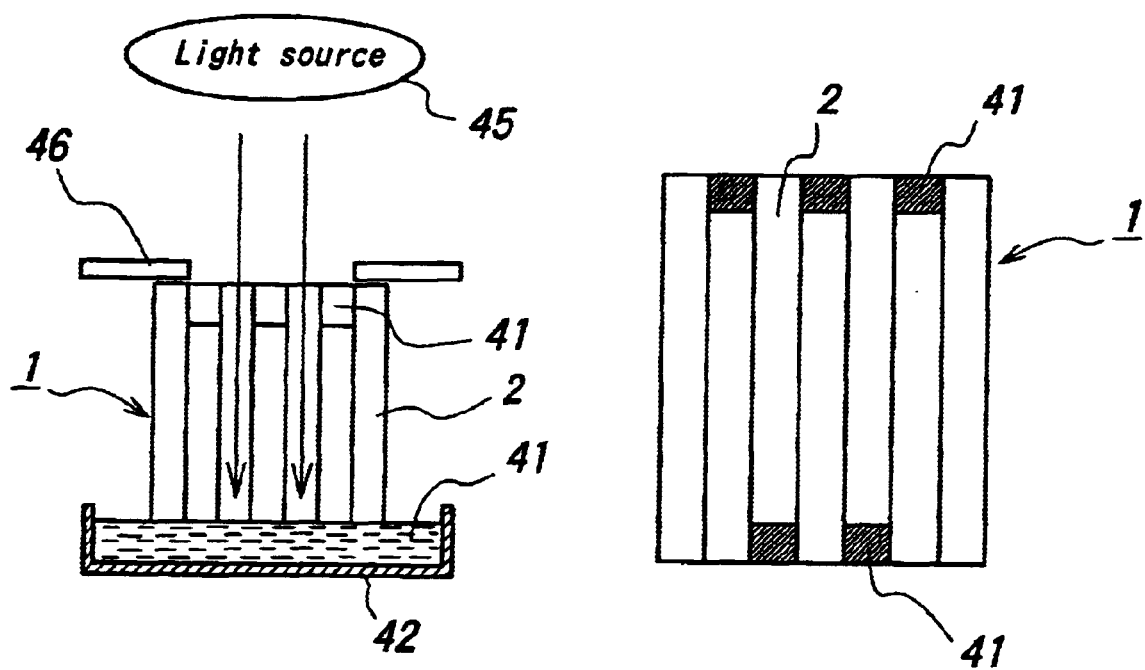
FIGS. 14a and 14b are schematic view respectively explaining still another in the embodiment shown in FIG. 12.
Figure 15A:
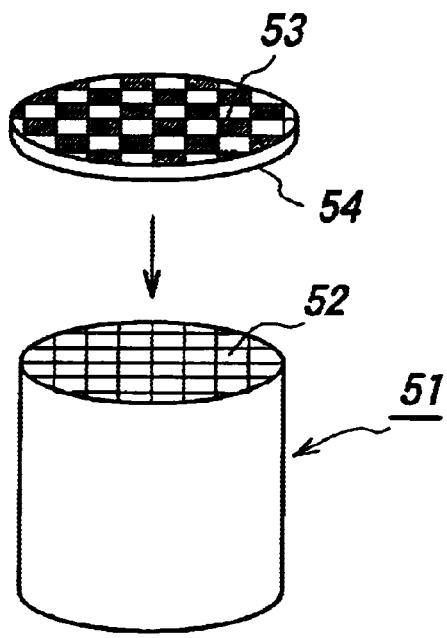
FIGS. 15a–15c are schematic views respectively explaining one embodiment of the known method of producing a ceramic body.
Figure 15B:
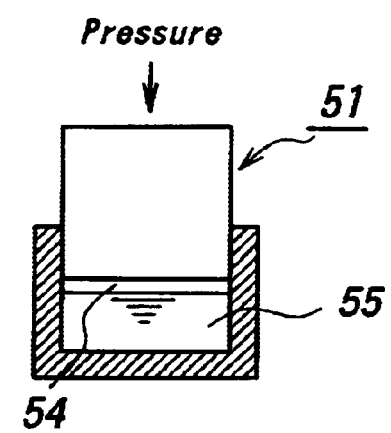
Figure 15C:
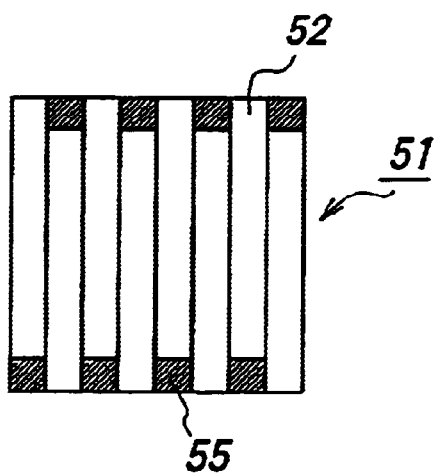

③ As to the other end face, the plugged resin 41 functions as the mask, since a light is shielded by the plugged resin. Therefore, as shown in FIG. 14a, the other end face is immersed into the photo-curing resin 41 stored in the tray 42, and a light emanating from the light source 45 is introduced to the end face of the ceramic honeycomb formed body 1. In this manner, as shown in FIG. 14b, the photo-curing resin 41 existing in the desired cells 2 is hardened. In this case, in order to plug all the outer peripheral portion of the ceramic honeycomb formed body 1, a light is not introduced to the photo-curing resin 41 at a peripheral portion by using a fixed mask 46 as shown in FIG. 14a.

④ Then, as explained by the previous embodiment shown in FIGS. 4a–4c, the plugging slurry 7 is filled into the cells 2 that are not plugged by the photo-curing resin 41 (corresponding to the paraffin 3 in FIG. 4) according to the known method. After that, the thus obtained ceramic honeycomb formed body 1 is dried and sintered, so that the photo-curing resin 41 is removed and the plugging slurry 7 is integrated with the cell wall. Accordingly, it is possible to obtain the ceramic body 10 as shown in FIG. 5.

INDUSTRIAL APPLICABILITY

As clearly understood from the above explanations, according to the invention, since a plugging operation of the end face of the ceramic honeycomb structural body is performed by using a plugging material for mask which can be removed at the sintering without using a mask, it is possible to eliminate a production of the mask and a setting operation of the mask with respect to the end face of the ceramic honeycomb structural body. Moreover, since a filling operation of various plugging materials for mask can be easily automated, the plugging operation of the ceramic body according to the invention can be also automated.

What is claimed is:

1. A method of producing a ceramic body having a construction such that cells are plugged alternately at both end faces of a ceramic honeycomb structural body by filling a plugging slurry into predetermined cells at both end faces of a ceramic honeycomb formed body, the method comprising the steps of:

filling a plugging material that forms a mask into only the cells to be opened at one end face of the ceramic honeycomb formed body where the plugging material is filled by the steps of:

preparing a suction jig having a same honeycomb construction as that of the ceramic honeycomb formed body;

adhering a mask, in which holes are arranged corresponding to the cells to be plugged with said plugging material, to one end face of the suction jig;

sucking paraffin balls, a diameter of which is larger than a length of one wide of the cell, to said cells to be plugged with said plugging material at the other end face by sucking from the end face to which the mask is adhered;

setting the suction jig, to which paraffin balls are sucked, to the end face of the ceramic honeycomb formed body to which the plugging material is to be filled;

aligning the paraffin balls to the cells to be opened by stopping the sucking operation;

inserting the thus aligned paraffin balls into the cells by applying pressure; and filling the paraffin balls into the cells to be opened as the plugging material that forms a mask;

immersing the end face, to which the plugging material that forms a mask is filled, into a plugging slurry; and drying and sintering the ceramic honeycomb formed body while the plugging material that forms a mask is removed during a drying stop or a sintering step.

2. The method of producing a ceramic body according to claim 1, further comprising the steps of:

sucking the paraffin balls to the other end face by sucking from the one end face to which the paraffin balls are filled;

inserting the thus sucked paraffin balls into the cells by applying a pressure; and filling the paraffin balls into the cells to be opened of the other end face.

3. The method of producing a ceramic body according to claim 1, wherein the ceramic honeycomb formed body, in which the paraffin balls are filled into the cells of the one end face, is used as the suction jig for filling the paraffin balls of the next ceramic honeycomb formed body.

* * * * *